United States Patent [19]

Schluter

[11] Patent Number: 5,079,914
[45] Date of Patent: Jan. 14, 1992

[54] HYDRAULIC BRAKE SYSTEM WITH FAST-FILL VALVE

[75] Inventor: Peter Schluter, Kammerforst, Fed. Rep. of Germany

[73] Assignee: Lucas Industries public limited company, Birmingham, England

[21] Appl. No.: 449,908
[22] PCT Filed: Apr. 14, 1989
[86] PCT No.: PCT/EP89/00400
§ 371 Date: Nov. 27, 1989
§ 102(e) Date: Nov. 27, 1989
[87] PCT Pub. No.: WO89/09713
PCT Pub. Date: Oct. 19, 1989

[30] Foreign Application Priority Data

Apr. 15, 1988 [DE] Fed. Rep. of Germany ... 8805017[U]

[51] Int. Cl.$^5$ .............................................. B60T 11/08
[52] U.S. Cl. .................................... 60/578; 60/574
[58] Field of Search .................. 60/550, 574, 575, 578

[56] References Cited

U.S. PATENT DOCUMENTS

| | | | |
|---|---|---|---|
| 2,458,803 | 1/1949 | Stelzer | 60/578 X |
| 3,635,028 | 1/1972 | Sherman | 60/578 |
| 3,978,670 | 9/1976 | Kruse et al. | 60/550 X |
| 4,156,348 | 5/1979 | Brown | 60/578 |
| 4,667,466 | 5/1987 | Mizusaki | 60/578 |
| 4,729,609 | 3/1988 | Seibert et al. | 60/574 X |
| 4,754,605 | 7/1988 | Seibert et al. | 60/578 |
| 4,860,541 | 8/1989 | Steer | 60/578 |
| 4,942,738 | 7/1990 | Kaub | 60/550 |

Primary Examiner—Edward K. Look
Assistant Examiner—John Ryznic
Attorney, Agent, or Firm—Oblon, Spivak, McClelland, Maier & Neustadt

[57] ABSTRACT

A hydraulic brake system comprising a master brake cylinder (10), a brake force booster (12) and a filling chamber (38) by means of which in the initial phase of a brake actuation the brake system on relatively short pedal travel is rapidly filled with hydraulic brake fluid up to a predetermined switch-off pressure, the filling chamber (38) being in conductive communication with a primary chamber (22) of the master brake cylinder (10) and connectable to a hydraulic fluid reservoir (62) via a first valve (82) which closes when the brake force booster (12) is functioning and a pressure obtains in the hydraulic fluid below the switch-off pressure and opens when the brake force booster is not functioning, is characterized in that in the connecting conduit (60, 72, 74, 78) between the filling chamber (38) and the primary chamber (22) a second valve (76) is arranged which closes at a pressure in the hydraulic fluid above the switch-off pressure.

2 Claims, 3 Drawing Sheets

HYDRAULIC BRAKE SYSTEM WITH FAST-FILL VALVE

BACKGROUND OF THE INVENTION

The invention relates to a hydraulic brake system comprising a master brake cylinder, a brake force booster and a filling chamber by means of which in the initial phase of a brake actuation the brake system on relatively short pedal travel is rapidly filled with hydraulic fluid up to a predetermined switch-off pressure, the filling chamber being in conductive communication with a primary chamber of the master brake cylinder and connectable to a hydraulic fluid reservoir via a first valve which closes when the brake force booster is functioning and a pressure obtains in the hydraulic fluid below the switch-off pressure and opens when the brake force booster is not functioning.

Thus, in such a hydraulic brake system known from DE-OS 3,508,753 the usual master brake cylinder is supplemented by a brake force booster likewise known per se and a so-called filling stage. Filling stages are known per se for example from U.S. Pat. No. 4,086,770. A filling stage achieves that on a brake actuation in the initial phase of the pedal travel the brake system is rapidly filled with hydraulic fluid. The driver therefore need only press the brake pedal through a relatively short travel. As soon as a predetermined pressure is reached in the hydraulic fluid, the so-called switch-off pressure, the filling stage switches off, i.e. becomes ineffective. On further pressing down of the brake pedal hardly any hydraulic fluid is then moved in the brake system, the pedal pressure instead being directly converted hydraulically to brake pressure.

Brake force intensifiers or boosters, known for example from DE-OS 2,450,474 and U.S. Pat. No. 3,109,287, assist the action of the brake pedal and as a rule comprise two chambers with a movable partition which is referred to as diaphragm plate. By means of the engine a pressure difference is generated between the chambers so that the diaphragm plate assists the action of the brake pedal actuated by the driver.

In DE-OS 3,508,753, cited at the beginning, the filling stage and the brake force booster are designed to be dependent on each other in their function, i.e. the filling stage and brake force booster do not function independently of each other. This is based on the recognition that on failure of the brake force booster considerable problems can result from the driver then having to apply directly via the brake pedal (in addition to the normal pressure buildup in the master brake cylinder) the actuating force for the filling stage up to the relatively high switch-off pressure. The resulting change in the pedal resistance can irritate the driver.

DE-OS 3,508,753 therefore avoids the driver detecting troublesome irregularities in the resistance of the brake pedal on failure of the brake force booster. For this purpose, the filling chamber of the filling stage is connectable to a reservoir for hydraulic fluid via a valve which closes when the brake force booster is functioning and opens when the brake force booster is not functioning. Between the filling chamber and the primary chamber (i.e. the high-pressure chamber in the master brake cylinder for supplying the primary circuit of a dual circuit brake system) a sealing sleeve is disposed which allows hydraulic fluid from the filling chamber into the high-pressure chamber but blocks said fluid in the reverse direction.

The invention is based on the problem in a hydraulic brake system of the type according to the preamble of further increasing the functional reliability.

SUMMARY OF THE INVENTION

According to the invention this problem is solved in that in the connecting conduit between the filling chamber and the primary chamber a second valve is arranged which closes at a pressure in the hydraulic fluid above the switch-off pressure.

Thus, whereas in the prior art forming the preamble according to DE-OS 3,508,753 the filling chamber of the filling stage is connected via a sealing sleeve to the primary chamber of the master brake cylinder, according to the invention it is now proposed that in said connecting conduit a valve be provided which closes when the pressure in the hydraulic fluid has reached the switch-off pressure of the filling stage so that the conductive communication between the filling chamber and the primary chamber is interrupted and the driver now increases the brake pressure solely via the brake pedal and possibly with the assistance of the brake force booster.

This arrangement of a further valve in the connection conduit between filling chamber and primary chamber according to the invention gives a number of improvements over the prior art. According to the invention, the dependence of the function of the filling stage on the functionability of the brake force booster no longer depends on frictional forces generated by resilient seals, which due to production tolerances and/or wear can vary to a great extent. The arrangement according to the invention also overcomes the disadvantage of the prior art that the closing or opening of the connection between the filling chamber and the reservoir requires a quite specific pressure in a chamber of the brake force booster.

Moreover, with the configuration of the brake system according to the invention even on failure of the brake force booster during a braking no effects irritating to the driver occur.

With the further development of the invention described in the subsidiary claims it is moreover possible to perform a substantially self-monitoring of the functionability of the hydraulic brake system. Should the resilient seals provided in the valves become leaky due to wear this manifests itself to the driver by a drastic change in the pedal travel and resistance without the brake immediately losing its functionability. Thus, in spite of a defective seal the driver can continue to a service station with the brakes operating properly.

BRIEF DESCRIPTION OF THE DRAWINGS

Hereinafter an example of embodiment of the invention will be explained in detail with the aid of the drawings, wherein.

Figure 1:
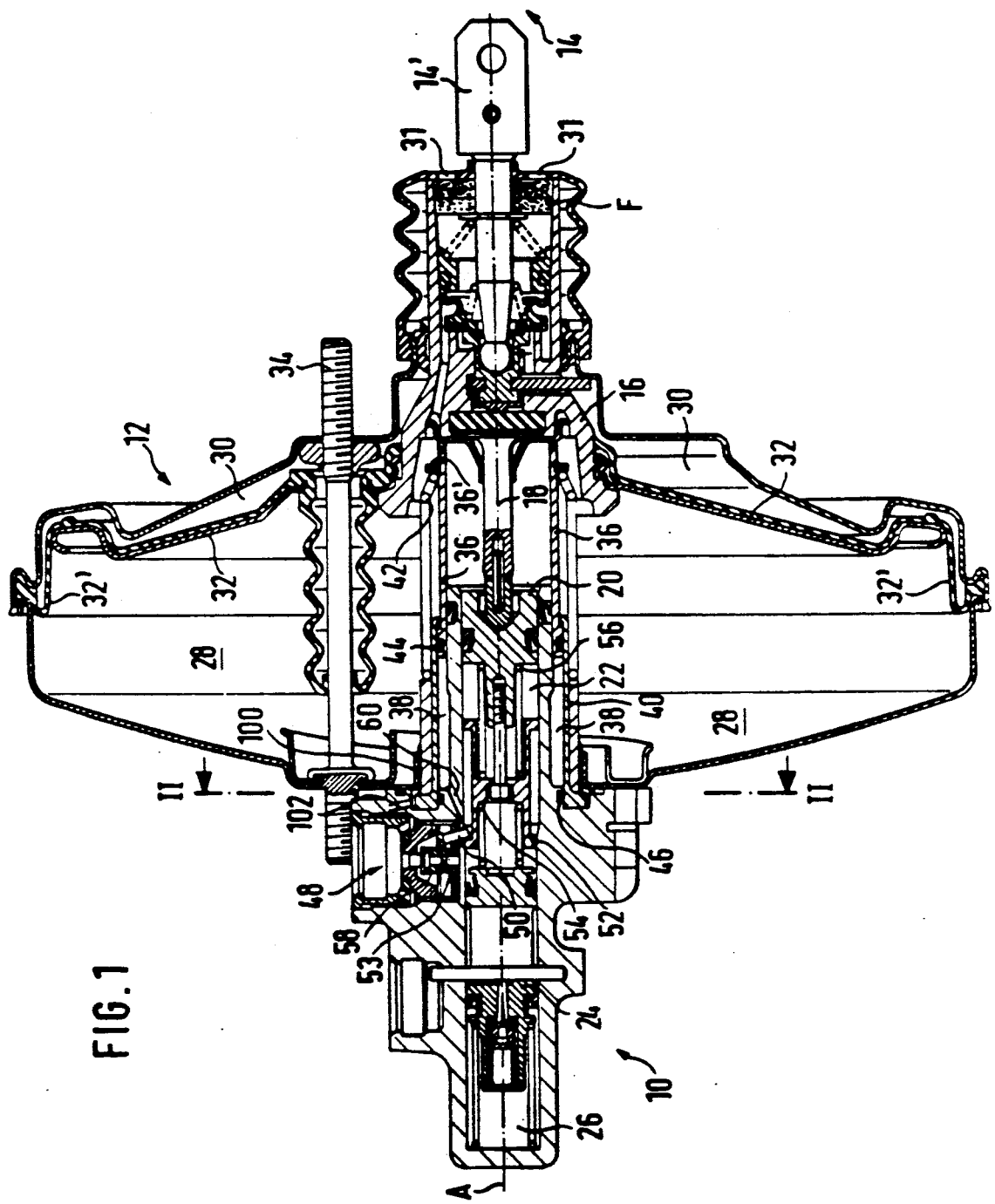
FIG. 1 is an axial section through a master brake cylinder including a brake force booster.

In the Figures a master brake cylinder 10, known in its essential parts, is shown including a brake force booster 12. A brake pedal to be actuated by the driver is disposed at 14 and on braking presses a pedal pushrod 14' in FIG. 1 from the right to the left. The pedal pushrod is connected to a control housing 16 which is known per se and which via a second pushrod 18 acts on a primary piston 20. On movement of the primary piston 20 to the left in FIG. 1 the pressure in a hydraulic fluid in a primary chamber 22 is increased. On actuation of the pedal pushrod 14' a secondary piston 24 likewise moves to the left and increases the pressure of the hydraulic fluid in a secondary chamber 26. This is a so-called dual circuit brake and the master brake cylinder 10 is a so-called tandem master cylinder.

The brake force booster 12 likewise known per se comprises a low-pressure chamber 28 and a high-pressure chamber 30 which are separated from each other by a movable diaphragm plate 32 and an elastic diaphragm 32'. Via an air inlet 31 air under atmospheric pressure enters the high-pressure chamber 30 whilst in the low-pressure chamber 28 a partial vacuum is generated by means of the engine so that the diaphragm plate moves in known manner in FIG. 1 from the right to the left and via the control housing 16 thereby acts on the pushrod 18. The diaphragm plate 32 is guided on a guide pin 34.

The master brake cylinder 10 is provided with a filling stage which will be described below. The filling stage comprises an annular piston 36 which is acted upon only by the diaphragm plate 32 of the brake force booster 12, i.e. not by the brake pedal. The annular piston 36 has a substantially larger diameter than the primary piston 20 and the secondary piston 24 and by means of the diaphragm plate 32 is pushed in FIG. 1 to the left into a filling chamber 38 so that hydraulic fluid contained therein is subjected to pressure and under conditions described hereinafter forced into the primary chamber 22.

The filling chamber 38 is bordered on the outside by a sleeve 40. A spring 42 is pushed over the sleeve 40 and bears on the left in FIG. 1 on a fixed stop. On the right the spring 42 presses against a stop 36' of the annular piston 36 so that the latter is biased to the right.

The filling chamber 38 is sealed by seals 44, 46.

The master brake cylinder 10 is further provided with a compensating container 48 known per se in which hydraulic fluid is kept ready for compensating possible losses in the brake system. The compensation of lost hydraulic fluid is by means of a pivot lever 50 which in a manner known per se when required opens the conductive communication between the compensating container 48 and the primary and secondary chambers. For this purpose, a sleeve 52 is provided which is displaceable in the axial direction and subjected to the action of two springs 54, 56 in opposite directions. The spring 56 is stronger than the spring 54. On actuation of the brake pedal the sleeve 52 moves in FIG. 1 to the left and the pivot lever 50 is freed. By means of a spring 53 the valve 58 connecting the compensating container 48 to the primary and secondary chambers remains closed. On the return travel of the pedal pushrod 14' the sleeve 52 can engage the pivot lever 50 and open the valve 58 so that replenishment of hydraulic fluid can take place.

A passage 60 branches off the filling chamber 38 and leads via chambers described below, bores and a valve to the primary chamber 22.

Figure 2:
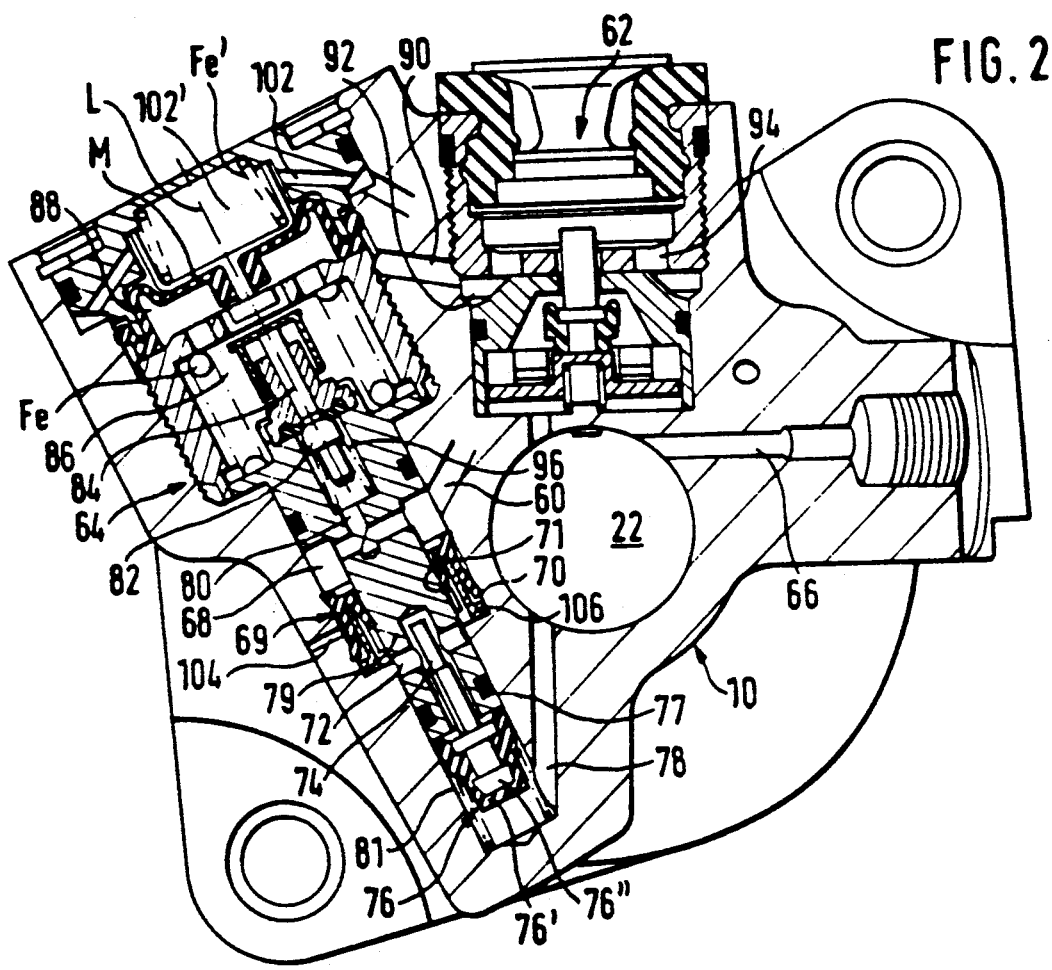
FIG. 2 is a section along the line I—I of FIG. 1.

In accordance with the section shown in FIG. 2 perpendicularly to the longitudinal axis A of the master brake cylinder 10 in addition to the compensating container 48 a reservoir 62 for hydraulic fluid is provided and cooperates with the filling stage.

A valve arrangement 64 (FIG. 2) is arranged between the passage 60 coming from the filling chamber 38 and the reservoir 62 on the one hand and the primary chamber 22 on the other hand. The passage 60 thus branches in accordance with FIG. 2 firstly to the reservoir 62 and secondly to the primary chamber 22, valves described below being respectively interposed, see also the block circuit diagram according to FIG. 3.

Firstly, the connection between the filling chamber 38 and the primary chamber 22 will be described. The passage 60 coming from the filling chamber 38 opens into a space 68 (FIG. 2). Via one of two sealing lips 70, 71 of a valve 69 described in further detail below the flow path for the hydraulic fluid passes through a bore 72 into a further bore 74 which is made coaxial with the longitudinal axis L of the valve arrangement 64. Via a further valve 76 the flow path merges into the passage 78 which leads directly into the primary chamber 22. In FIG. 2 the connection passage 66 of the primary brake circuit can also be seen.

The connection between the filling chamber 38 and the reservoir 62 will now be described. The passage 60 coming from the filling chamber 38 also opens into a bore 80 from whence the flow path of the hydraulic fluid leads past a valve 82 through a passage 84 into a chamber 86 which in accordance with FIG. 2 is connected to a further chamber 88. From the chamber 88 a passage 90 leads to an annular space 92 which is connected via a passage 94 to the reservoir 62.

The valve 82 opening and closing the connection between the passage 60 and the reservoir 62 is biased into the closure position by means of a spring 96.

According to FIG. 1 a slot 100 leads from the low-pressure chamber 28 to a passage 102, the continuation of which is shown in FIG. 2. The passage 102 opens into a chamber 102' which is separated by a diaphragm M from the chamber 88.

Figure 3:
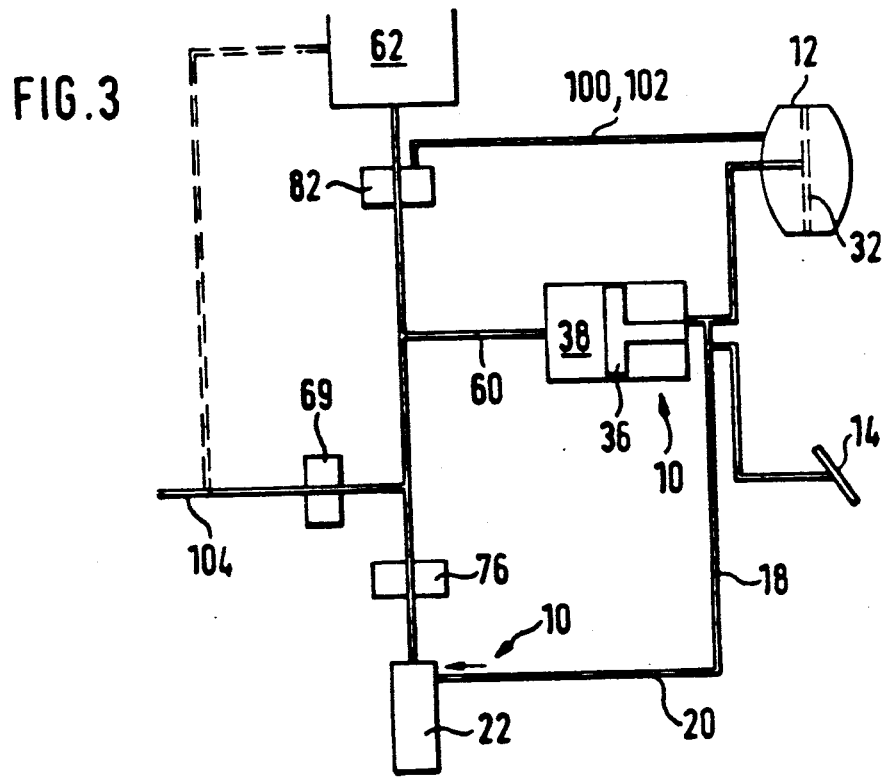
FIG. 3 is a hydraulic block circuit diagram of the brake system according to FIGS. 1 and 2 and FIG. 4 is a modification of a detail of FIG. 2.

Finally, FIG. 2 further shows a passage 104 which branches from the flow path between the passage 60 and the valve 76 into the outer atmosphere or optionally to the reservoir 62 (see also FIG. 3). The passage 104, as described further below, is normally closed by a sealing lip 70 of the valve 69. A support ring 106 holds the sealing lip of the valve 69 initially in the closure position.

FIG. 3 shows the components essential to the function of the brake system in schematic block illustration.

OPERATION

The function of the brake system is as follows: On actuation of the brake pedal, via the pedal pushrod 14' the force exerted by the driver is transferred to the primary and secondary pistons 20 and 24 respectively. When the brake force booster 12 is functioning a partial vacuum is generated in the low-pressure chamber 28 so that the diaphragm plate 32 moves the annular piston 36 to the left in FIG. 1. Hydraulic fluid flows from the filling chamber 38 via the passage 60 into the space 68 and via the opened valve 76 past the sealing cap 76' thereof, which is moved by the pressure gradient into the open position, via the passage 78 into the primary chamber 22.

When the brake force booster 12 is functioning the flow path leading from the passage 60 to the reservoir 62 is initially closed during a braking because the valve 82 is urged by the spring 96 into the closure position.

When the brake force booster is functioning a partial vacuum obtains in the low-pressure chamber 28 and is transferred via the slot 100 and the passage 102 to the chamber 102'. Due to the pressure conditions obtaining when the brake force booster is functioning the valve 82 therefore remains closed.

If the pressure in the hydraulic fluid reaches a predetermined switch-off pressure of for example 22 bar the valve 76 closes the path between the filling chamber 38 and the primary chamber 22 so that in the latter the hydraulic pressure can only be further increased by further movement of the pedal pushrod 14'. On closure of the valve 76 the hydraulic pressure obtaining in the primary chamber 22 presses the resilient valve cap 76' against the body 79 which is guided slidingly in the bore 81 by means of the seal 77.

On a further increase in the hydraulic pressure in the primary chamber 22 the pushrod 76" enclosed by the valve cap 76' is pressed upwardly against the force of the spring Fe in FIG. 2. When this happens the valve 82 opens so that the pressure of the filling chamber 38 present at the passage 60 is reduced via the passage 90 to the reservoir 62. The sequence described above requires a functioning brake force booster 12.

If, due to vacuum failure, the brake force booster 12 is not functioning no reduced pressure is formed in the chamber 102' and consequently via the diaphragm M the valve 82 is pressed into the open position. The flow resistance of the path past the sealing cap 76' of the valve 76 into the passage 78 is greater than the flow resistance past the valve 82 into the reservoir 62 so that when the brake force booster is not functioning the filling stage is inoperative.

By the effective pressure area of the diaphragm M it is possible to exactly define the pressure at which the valve 82 opens and the filling stage thus becomes ineffective.

If during a braking the brake force booster 12 fails the spring Fe' opens the valve 82 (the valve area of which is relatively small) against the hydraulic pressure so that the filling stage likewise becomes ineffective.

It is conceivable that a very careful driver over long periods of time will never actuate the brake with such force that the switch-off pressure of for example 22 bar is reached. The arrangement according to the invention permits that even in this case a possible defect of the seals 77 and 76' can be detected by the driver. This is done as follows: As described above, in the pressure buildup (forward stroke of the pedal pushrod 14') hydraulic fluid flows freely over the sealing lip 71 of the valve 69. On a return stroke, i.e. a rearward travel of the pedal pushrod 14' in FIG. 1 to the right, the pressure in the primary chamber 22 gradually drops. The annular piston 36 is urged by the spring 42 to the right in FIG. 1. The spring 42 is so dimensioned that the pressure in the filling chamber 38 is reduced substantially quicker than in the primary chamber 22. Thus, a partial vacuum immediately results in the filling chamber 38 and the space 68. If the seals 77 and 76' are defective the pressure gradient causes the sealing lip 70 of the valve 69 to lift off the passage 104 and thus establishes a conductive communication to the outer atmosphere. In this movement the sealing lip is arrested behind the support ring 106 so that thereafter the passage 104 remains open. Consequently, on the next brake actuation it is no longer possible for a pressure to be built up in the filling chamber and this is clearly noticed by the driver because the pedal travel on braking is substantially increased.

The function of the inner sealing lip 71 of the valve 69, over which fluid flows on pressure reduction, is also automatically monitored. For should the sealing lip 71 no longer close properly a reduced pressure arises on the inner side of the other sealing lip 70 of the valve 69 and as a result the axis to the passage 104 is opened. Air thus flows into the filling chamber 38 and after a few brake actuations the filling stage will fail and the driver will notice this due to the considerably increased pedal travel and will therefore be able, with an otherwise still functioning brake, to drive to a service station.

The functions of the valves explained above can be summarized as follows with reference to FIG. 3 if the switch-off pressure of the filling stage is set to 22 bar:

1) With brake force booster functioning:
   Valve 82 closed up to 22 bar.
   Valve 76 open up to 22 bar.

Valve 82 open above 22 bar.
   Valve 76 closed above 22 bar.

Valve 69 always closed.

2) Brake force booster not functionable:
   Valve 82 open.
   Valve 76 closed.
   Valve 69 closed.

3) Valve 76 or seal 77 defective:
   Valve 69 open.

Figure 4:
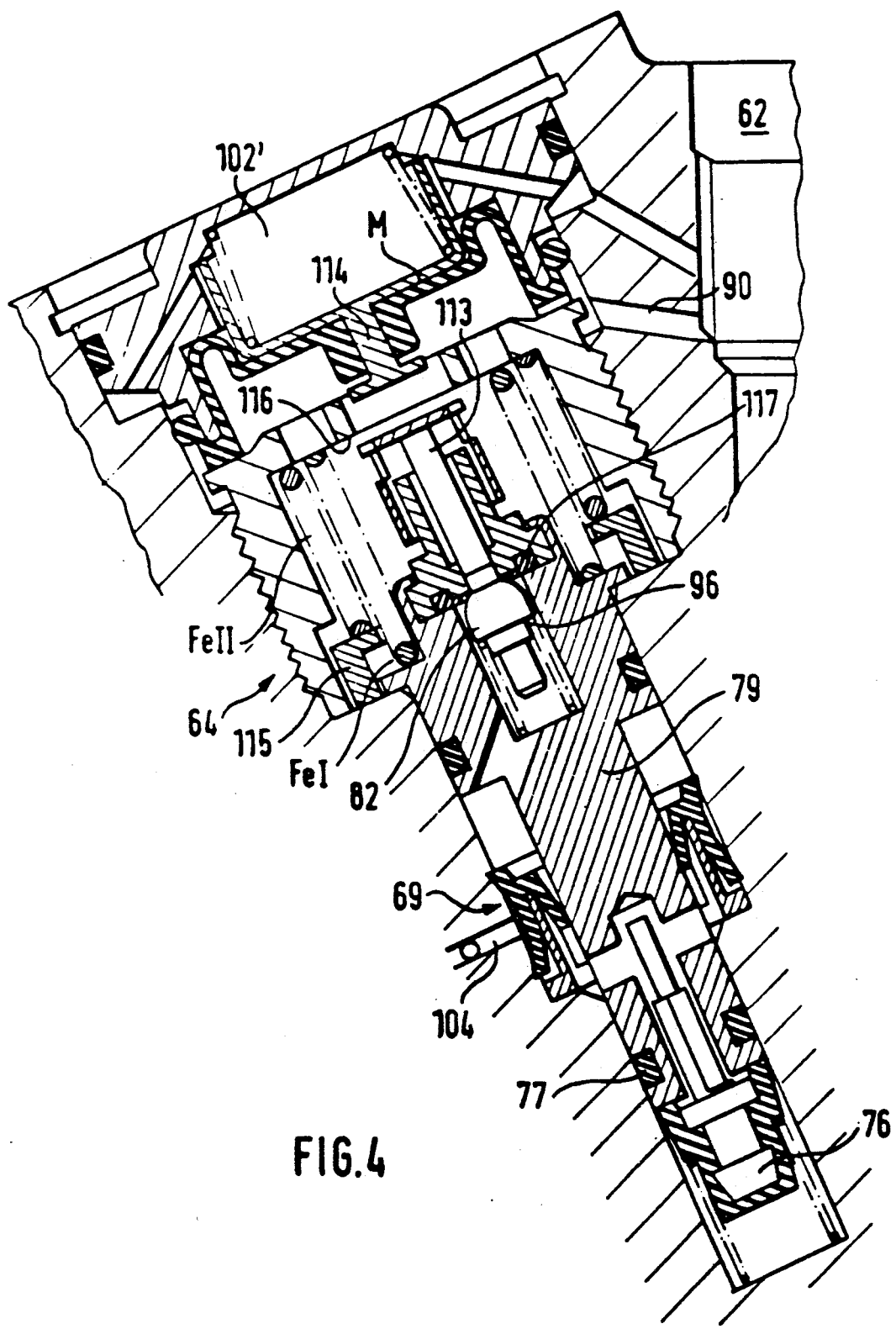

FIG. 4 shows a modification of the valve arrangement 64 according to FIG. 2 to a larger scale. The construction according to FIG. 4 differs from that according to FIG. 2 essentially in that the spring Fe is now replaced by two different springs FeI and FeII.

The spring FeI holds the body 79 of the valve 76 in the lower position. The valve pushrod 113 cannot be reached by the vacuum piston 114 even when an adequate vacuum does not obtain in the chamber 102'. For this reason, the valve 82 remains closed even when the vacuum is inadequate.

If the pressure in the filling chamber and the primary chamber reaches a second switch-off value of about 6 to 8 bar the body 79 moves in FIG. 4 upwardly in the direction towards a ring 115. As this happens, the spring FeI is compressed. The valve pushrod 113 is now in the travel region of the vacuum piston 114 and when the vacuum in the chamber 102' fails the valve piston 114 can open the valve 82 by means of the valve pushrod 113. The pressure in the filling chamber then immediately drops. If adequate vacuum is present in the chamber 102' the valve piston 114 is pressed by means of the diaphragm M into its upper position (FIG. 4). If on further depression of the brake the pressure in the hydraulic fluid reaches a first switch-off value of about 22 bar the body 79 will move upwardly against the force of the two springs FeI and FeII in FIG. 4, the valve pushrod 113 striking against the stop 116 and the valve 82 thus opening so that the pressure in the filling chamber drops.

The arrangement described with reference to FIG. 4 has the advantage that the driver does not erroneously deduce that the brake system is effective when the vacuum in the brake force booster has dropped below a certain value without said booster being defective, for example due to a lengthy manoeuvre. In the arrangement according to FIG. 4 the switch-off pressure of the filling stage is controlled in two stages. A relatively low pressure of about 6 to 8 bar is built up in the filling chamber and in the primary circuit. This is also true when the brake force booster is defective. It is only when this pressure has been reached that a switching-off of the filling stage is possible at all. Up to this pressure however the so-called idle travels of the brakes have been overcome and the brake linings applied to the brake disc or the like. Up to this pressure the pressure has been increased both with the filling stage and with the primary piston, i.e. the process carried out with a relatively large hydraulically effective area. The associated pedal travel is therefore relatively small.

I claim:

1. A hydraulic brake system comprising a master brake cylinder having at least a primary pressure chamber, a brake force booster, a reservoir and a filling chamber by means of which, during brake actuation, the brake system on relatively sort pedal travel is initially rapidly filled with hydraulic fluid, means responsive upon brake actuation to said booster when functional for connecting said filling chamber to said primary chamber and disconnecting said filling chamber from said reservoir so long as the pressure in said system is below a first predetermined switch-off pressure and for connecting said filling chamber to said reservoir and disconnecting it from said primary chamber when said pressure is above said first predetermined switch-off pressure, and means responsive upon brake actuation to said booster when non-functional to connect said filling chamber to said primary chamber so long as the pressure in said system is below a second predetermined switch-off pressure substantially less than said first switch-off pressure ad to connect said filling chamber to said reservoir and disconnect it from said primary chamber when the pressure is above said second switch-off pressure.

2. The hydraulic brake system according to claim 1 including a connecting conduit between said filling chamber and said primary chamber, seal means in said conduit, a passage for connecting said conduit to outer atmosphere or to said reservoir, and a valve in said conduit normally closing said passage but being responsive to failure of said seal means to connect said conduit to said passage.

* * * * *